(12) United States Patent
Usher et al.

(10) Patent No.: US 10,847,959 B1
(45) Date of Patent: Nov. 24, 2020

(54) MOUNTING A POWER DISTRIBUTION UNIT WITHIN A MOUNTING SUBSTRATE

(71) Applicants: Scott D. Usher, Teaneck, NJ (US); Daniel Deutsch, New York, NY (US)

(72) Inventors: Scott D. Usher, Teaneck, NJ (US); Daniel Deutsch, New York, NY (US)

( * ) Notice: Subject to any disclaimer, the term of this patent is extended or adjusted under 35 U.S.C. 154(b) by 0 days.

(21) Appl. No.: 16/184,383

(22) Filed: Nov. 8, 2018

(51) Int. Cl.
| | |
|---|---|
| *H02G 3/12* | (2006.01) |
| *H01R 13/74* | (2006.01) |
| *H01R 25/00* | (2006.01) |
| *H02G 3/08* | (2006.01) |

(52) U.S. Cl.
CPC .............. *H02G 3/12* (2013.01); *H01R 13/74* (2013.01); *H01R 25/006* (2013.01); *H02G 3/081* (2013.01)

(58) Field of Classification Search
CPC  H02G 3/12; H02G 3/121; H02G 3/18; H02G 3/185
USPC .......................................................... 220/3.3
See application file for complete search history.

(56) References Cited

U.S. PATENT DOCUMENTS

| | | |
|---|---|---|
| 4,390,105 A | 6/1983 | Graves |
| 2007/0164178 A1 | 7/2007 | Beilstein et al. |
| 2014/0021313 A1* | 1/2014 | Gagne .................... H02G 3/121 248/205.1 |
| 2016/0198581 A1* | 7/2016 | Caille .................... H02G 3/123 174/50 |
| 2017/0149181 A1 | 5/2017 | Nelson et al. |

* cited by examiner

*Primary Examiner* — Anthony D Stashick
*Assistant Examiner* — Raven Collins
(74) *Attorney, Agent, or Firm* — Arthur Jacob

(57) ABSTRACT

A mounting system and method secure a power distribution unit within a substrate at sites where access behind the substrate is unavailable to a worker effecting the installation. The power distribution unit is coupled to a trim plate for displacement relative to the trim plate when the trim plate is engaged with an obverse surface of the substrate. Displacement of the power distribution unit relative to the trim plate from a first position into a second position beyond the obverse surface, and then release of the power distribution unit for return toward the first position, in response to a biasing force, enables a retention member to lock the power distribution unit in place within the substrate. Selective removal of the power distribution unit from the substrate is accomplished by lifting the trim plate from the obverse surface of the substrate to effect release of the retention member from the power distribution unit, thereby releasing the power distribution unit from the substrate.

11 Claims, 6 Drawing Sheets

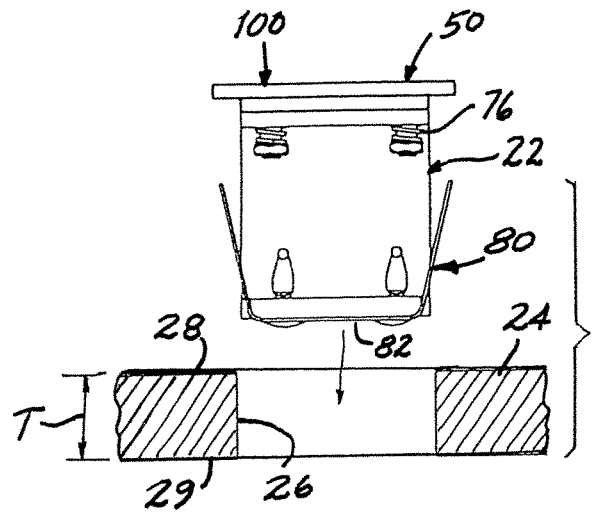
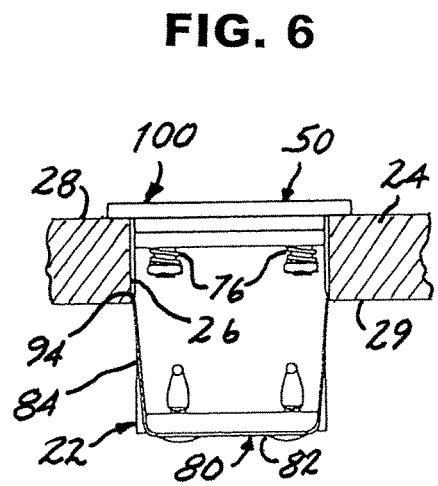
FIG. 5
FIG. 6
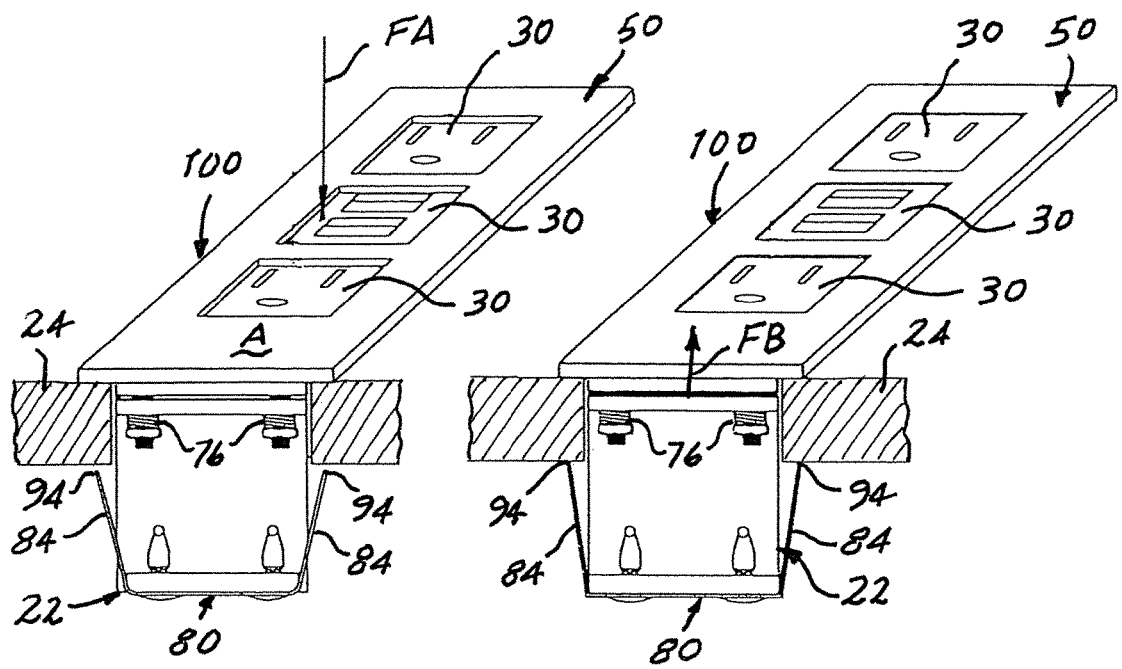
FIG. 7  FIG. 8

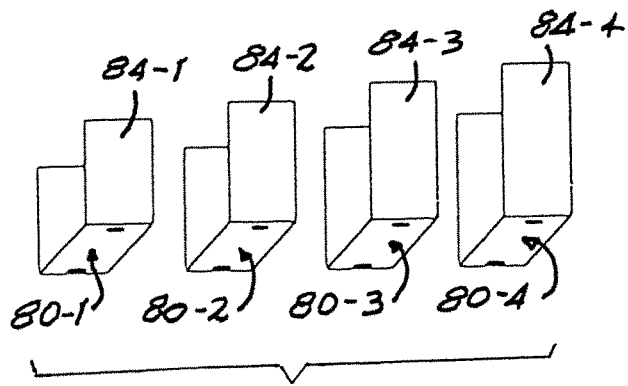
FIG. 9
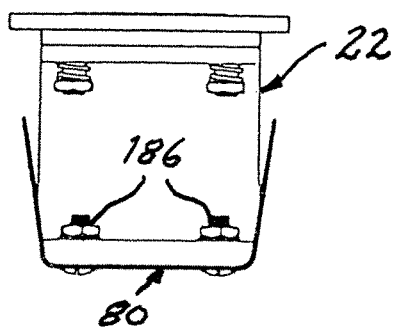
FIG. 11
FIG. 10
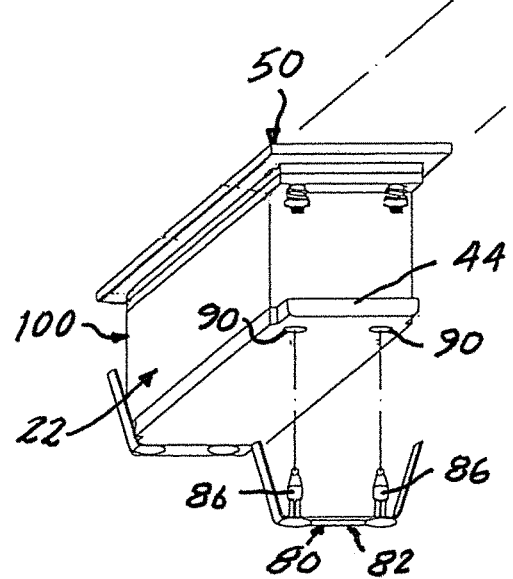

MOUNTING A POWER DISTRIBUTION UNIT WITHIN A MOUNTING SUBSTRATE

The present invention relates generally to mounting a power distribution unit within a mounting substrate and pertains, more specifically, to a system and method for installing and securing a power distribution unit within a blind hole in a mounting substrate wherein access behind the mounting substrate is unavailable.

As demand increases for ready access to a variety of power outlets, power distribution units are being installed at a multitude of locations that provide convenient access to power outlets that cater to the demand. Power distribution units that provide ready connection to a variety of power sources are becoming more commonly available through installations at an increasing number of convenient locations. Many of these locations call for installation within a mounting substrate available in substrates in the form of panels and the like where openings provided for the reception of a power distribution unit, usually within a trim plate placed along an obverse surface of a panel, do not have access to a reverse surface of the panel and thus require a "blind hole" installation. For example, desks, work tables and a variety of credenzas and consoles, as well as walls and floors, all present attractive and convenient obverse mounting surfaces, while remote, reverse surfaces are unavailable to the installer.

The present invention provides a mounting system and method that enable a simple and effective mounting of a power distribution unit within a mounting substrate where direct access behind the substrate is not available to a worker effecting the installation. As such, the present invention provides several objects and advantages, some of which are summarized as follows: Provides a system and method enabling a secure mounting of a power distribution unit within an opening in a mounting substrate wherein direct access is not available behind the mounting substrate; establishes a secure "blind hole" installation of a power distribution unit within a mounting substrate; effects an aesthetically attractive installation of a power distribution unit within a mounting substrate; enables selective removal of a power distribution unit installed in a mounting substrate in accordance with the present invention; allows installation and selected removal of a power distribution unit without the necessity for specialized tools; enables a simplified, relatively rapid installation procedure wherein a power distribution unit is secured within a mounting substrate without requiring the use of an installation tool; provides a versatile construction and method adapted for use in a wide variety of settings; performs exemplary service over an extended service life.

The above objects and advantages, as well as further objects and advantages, are attained by the present invention which may be described briefly as a mounting system for securing a power distribution unit of predetermined longitudinal length, lateral width and altitudinal depth in place within a substrate having an obverse surface and an opening complementary to the length and width of the power distribution unit and extending into the substrate, altitudinally beyond the obverse surface, for receiving the power distribution unit within the substrate, and an obverse surface surrounding the opening, the power distribution unit including a first wall, a second wall spaced altitudinally from the first wall, and electrical receptacles carried by the power distribution unit, accessible at the first wall, the mounting system comprising: a trim plate for engaging the obverse surface and covering the opening of the substrate; a coupling construct for coupling the power distribution unit with the trim plate for movement of the power distribution unit relative to the trim plate altitudinally between a first position wherein the power distribution unit is in place for ready access to the electrical receptacles, and a second position wherein the power distribution unit is displaced altitudinally away from the first position, the coupling construct including a biasing structure biasing the power distribution unit with a biasing force in an altitudinal direction from the second position toward the first position; and laterally spaced apart arms coupled to the power distribution unit in juxtaposition with the second wall, each arm projecting from the power distribution unit substantially in the altitudinal direction and being resiliently biased in a lateral direction from a laterally inward position, wherein each arm is in close juxtaposition with the power distribution unit, toward a laterally outward position, wherein each arm is spaced laterally away from the power distribution unit; the arms each having a length terminating at a terminal end such that upon insertion of the power distribution unit into the opening of the substrate, and seating of the trim plate upon the obverse surface of the substrate, covering the opening, displacement of the power distribution unit, relative to the trim plate, into the second position and subsequent release of the power distribution unit for movement toward the first position, in response to the biasing force, each arm will be biased laterally outwardly, from a corresponding inward position toward a corresponding outward position, thereby effecting locking engagement of the terminal ends of the arms with the substrate to secure the power distribution unit in place within the substrate.

In addition, the present invention provides a method for securing a power distribution unit of predetermined longitudinal length, lateral width and altitudinal depth in place within a substrate having an obverse surface and an opening extending altitudinally beyond the obverse surface, the opening being complementary to the length and width of the power distribution unit for receiving the power distribution unit within the substrate, the power distribution unit including a first wall, a second wall spaced altitudinally from the first wall, and electrical receptacles carried by the power distribution unit and accessible at the first wall, the method comprising: coupling the power distribution unit with a trim plate for movement of the power distribution unit relative to the trim plate altitudinally between a first position wherein the power distribution unit is in place for ready access to the electrical receptacles, and a second position wherein the power distribution unit is displaced altitudinally away from the first position; inserting the power distribution unit into the opening of the substrate and seating the trim plate upon the obverse surface of the substrate, with the trim plate covering the opening of the substrate; biasing the power distribution unit with a biasing force in an altitudinal direction from the second position toward the first position; coupling laterally spaced apart arms to the power distribution unit in juxtaposition with the second wall, with each arm projecting from the power distribution unit substantially in the altitudinal direction; resiliently biasing each arm in a corresponding lateral direction from a laterally inward position, wherein each arm is in close juxtaposition with the power distribution unit, toward a corresponding laterally outward position, wherein each arm is spaced laterally away from the power distribution unit; providing each arm with a length terminating at a terminal end such that upon insertion of the power distribution unit into the opening of the substrate, and seating of the trim plate upon the obverse surface of the substrate, covering the opening, displacement of the power distribution unit, relative to the trim plate, into the second position and subsequent release of the power distribution unit for movement toward the first position, in response to the biasing force, each arm is biased laterally outwardly, from the corresponding inward position toward the corresponding outward position, thereby effecting locking engagement of the terminal ends of the arms with the substrate to secure the power distribution unit in place within the substrate.

The invention will be understood more fully, while still further objects and advantages will become apparent, in the following detailed description of preferred embodiments of the invention illustrated in the accompanying drawing, in which:

FIG. 5 is a partially diagrammatic view depicting a stage of a method being performed in accordance with the present invention;

FIG. 6 is a partially diagrammatic view depicting a further stage of the method;

FIG. 7 is a partially diagrammatic view depicting a still further stage of the method;

FIG. 8 is a partially diagrammatic view depicting completion of the method;

FIG. 9 is a pictorial view depicting alternate component parts of the mounting system;

FIG. 10 is a partially diagrammatic pictorial view illustrating a feature of the present invention;

FIG. 11 is an end elevational view illustrating an alternative embodiment of the mounting system;

Figure 1:
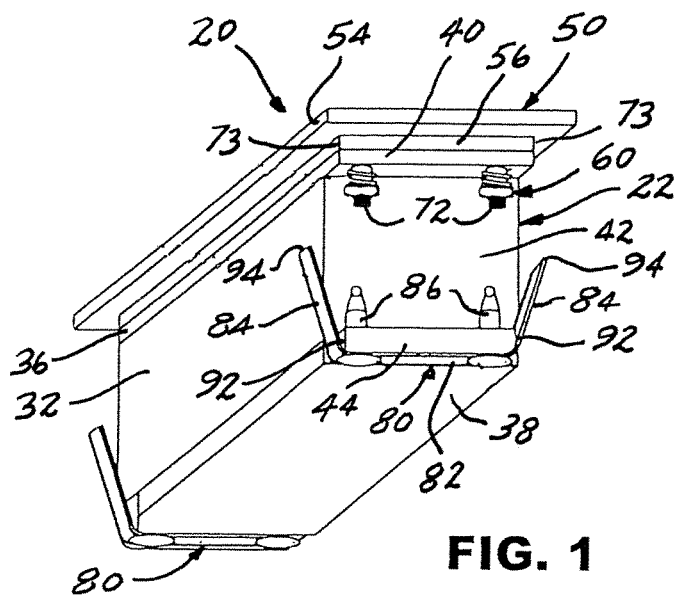
FIG. 1 is a pictorial view illustrating a mounting system constructed in accordance with the present invention for installing and securing a power distribution unit within a mounting substrate.

Referring now to the drawing, and especially to FIGS. 1 through 8 thereof, a mounting system constructed in accordance with the present invention is shown at 20 in connection with installing and securing a power distribution unit 22 within a mounting substrate shown in the form of a panel 24 having an opening 26 passing through the panel 24 for receiving the power distribution unit 22 within the panel 24. Panel 24 has an obverse surface 28 and a reverse surface 29 spaced from the obverse surface 28 by a thickness T. Power distribution unit 22 has a predetermined longitudinal length L, lateral width W and altitudinal depth D, and opening 26 has been provided with dimensions complementary to the length L and width W of power distribution unit 22. Panel 24 is located at an installation site where access to the reverse surface 29 is not available to an installer. Many installation sites, such as for example, desks, work tables and a variety of credenzas and consoles, as well as walls and floors, all present attractive and convenient obverse mounting surfaces, while remote, reverse surfaces are unavailable to an installer. The present mounting system enables an installer to quickly and effectively install a power distribution unit such as power distribution unit 22 at an installation site having access limited to an obverse surface.

As is typical in conventional electrical hubs, power distribution unit 22 carries a plurality of electrical receptacles 30 mounted within a casing 32 that envelops electrical circuitry (not shown) that distributes electrical power from a power source (not shown) to the electrical receptacles 30 in a now conventional manner. Casing 32 includes a first wall, shown in the form of an upper wall 36, through which upper wall 36 electrical receptacles 30 project, and a second wall, shown in the form of lower wall 38. Upper wall 36 has an upper tab 40 extending longitudinally from each end 42 of casing 32, while lower wall 38 has a lower tab 44 extending longitudinally from each end 42 of casing 32, each upper tab 40 extending above a corresponding lower tab 44.

Mounting system 20 includes a trim plate 50 having an upper part 52 with a peripheral edge 54 surrounding an overall area A for overlapping and covering opening 26 of panel 24. A lower part 56 of the trim plate 50 is provided with peripheral dimensions complementary to opening 26 for being seated within opening 26, as will be set forth in detail below. Mounting system 20 further includes a coupling construct 60 for coupling the power distribution unit 22 with trim plate 50 for movement of the power distribution unit 22 relative to trim plate 50 in altitudinal directions, between altitudinally spaced apart positions, as now will be described in connection with FIGS. 5 through 7, as well as FIGS. 1 through 4. It is to be understood that the terms "altitudinal" and "altitudinally" herein refer to positions or directions substantially orthogonal to the longitudinal and lateral positions or directions set forth herein and are not limited to elevational positions or directions.

Coupling construct 60 includes a biasing structure 70 comprised of a plurality of posts 72, here four posts 72, carried by trim plate 50, each post 72 being affixed to the trim plate 50 and projecting altitudinally downwardly from a corresponding corner 73 of lower part 56 of trim plate 50 to place the posts 72 spaced apart peripherally adjacent peripheral edge 54 of trim plate 50. Each post 72 extends within a corresponding opening 74 in an upper tab 40, in sliding engagement, and a biasing member in the form of a helical spring 76 extends over and along each post 72, between upper tab 40 and a stop 78 threadably engaged with the post 72 so as to enable selective adjustment of a biasing force biasing the power distribution unit 22 in an altitudinally upward direction UD toward a first position shown in the form of an upper position, illustrated in FIGS. 3 and 6, wherein electrical receptacles 30 are placed for ready access.

A retention member in the form of a spring clip 80 includes a basal section 82 and laterally opposite arms 84 unitary with the basal section 82, spaced apart laterally and projecting substantially upwardly in the altitudinally upward direction UD. Basal section 82 is coupled to power distribution unit 22 in juxtaposition with lower wall 38 by fasteners shown in the form of push fasteners 86 passed through complementary holes 90 extending through lower tabs 44, placed adjacent corners 92 of lower wall 38 of power distribution unit 22. Spring clip 80 preferably is constructed of spring steel and arms 84 extend upwardly and outwardly to respective terminal ends 94 spaced altitudinally away from upper part 52 of trim plate 50.

Figure 2:
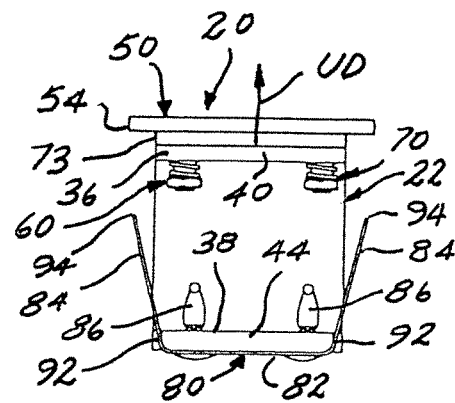
FIG. 2 is an end elevational view of the mounting system depicted in FIG. 1.
Figure 3:
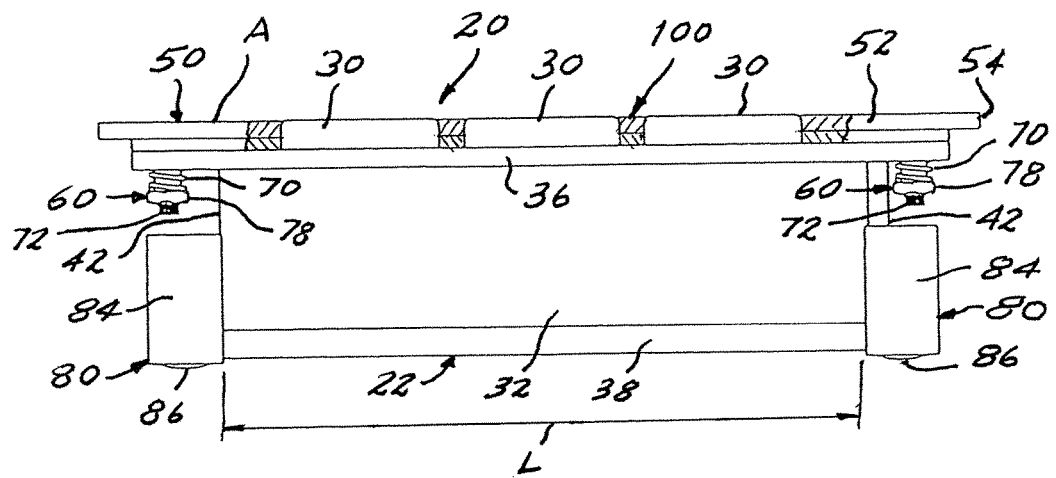
FIG. 3 is a side elevational view of the mounting system depicted in FIG. 1.
Figure 4:
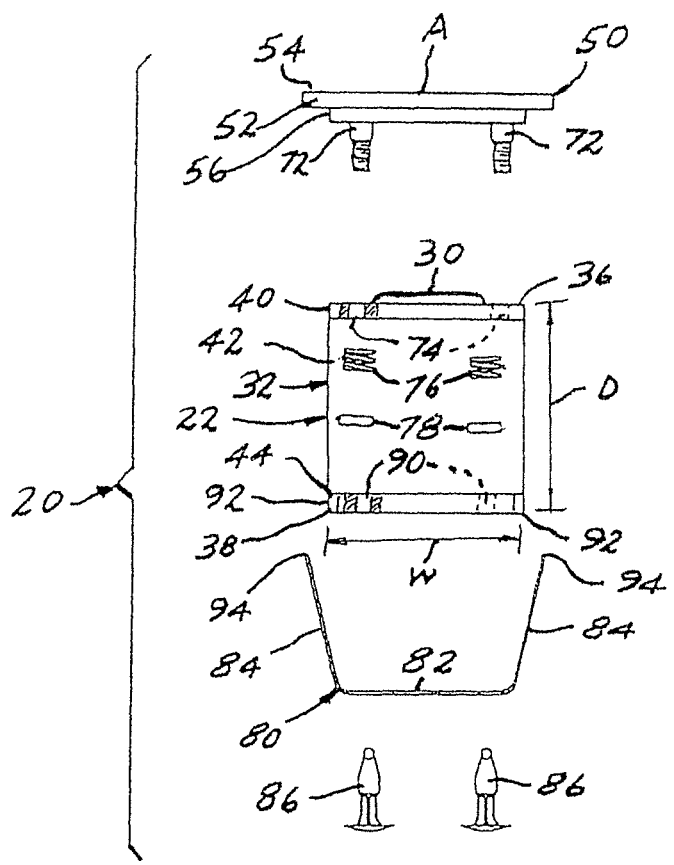
FIG. 4 is an exploded view showing component parts of the mounting system depicted in FIG. 1.

With specific reference now to FIGS. 5 through 8, as well as to FIG. 1, power distribution unit 22 is assembled with mounting system 20 in an assembly 100 wherein spring clip 80 is coupled to power distribution unit 22, and power distribution unit 22 is coupled to trim plate 50, biased by helical springs 76 into the upper position, against lower part 56 of trim plate 50, all as seen in FIGS. 1 through 3, and assembly 100 is aligned with opening 26 in panel 24, as seen in FIG. 5. Then, assembly 100 is lowered through opening 26 in panel 24 to seat trim plate 50 upon panel 24, as seen in FIG. 6. Note that at this stage, terminal ends 94 of arms 84 are captured within opening 26. Next, power distribution unit 22 is displaced downwardly by pushing against at least one of the exposed electrical receptacles 30, with an altitudinally downwardly directed displacement force, as illustrated at force FA in FIG. 7, thereby compressing helical springs 76, until power distribution unit 22 reaches a second position shown in the form of a lower position, where terminal ends 94 of arms 84 clear panel 24, and arms 84 spring laterally outwardly, beneath reverse surface 29 of panel 24, as seen in FIG. 7. Then, upon release of downwardly directed force FA, helical springs 76 will move power distribution unit 22 with an upwardly directed biasing force FB until terminal ends 94 of arms 84 engage panel 24 at reverse surface 29, thereby securing assembly 100 in place, fully installed within panel 24, with panel 24 locked between the terminal ends 94 of arms 84 and trim plate 50, as seen in FIG. 8.

With reference to FIG. 9, in order to compensate for different thicknesses T found in panels 24 encountered at various installations, spring clip 80 can be selected from a plurality of spring clips such as, for example, spring clips 80-1, 80-2, 80-3 and 80-4, each of which provides arms 84 of different lengths and each of which easily is affixed to power distribution unit 22 utilizing push fasteners 86.

Should it become necessary to remove power distribution unit 22 from the installed position illustrated in FIG. 8, a conventional prybar 110 may be inserted between trim plate 50 and obverse surface 28 of panel 24, and manipulated to move assembly 100 upwardly until push fasteners 86 are released from holes 90 in lower tabs 44, as illustrated in FIG. 10, thereby uncoupling spring clip 80 from power distribution unit 22, enabling concomitant release of power distribution unit 22 for upward movement out of opening 26 and away from panel 24.

In an alternate embodiment illustrated in FIG. 11, push fasteners 86 have been replaced by nut-and-bolt fasteners 186, thereby providing a more permanent, secure installation that will resist removal as outlined above in connection with FIG. 10.

Turning now to FIGS. 12 through 17, another mounting system constructed in accordance with the present invention is shown at 220 in connection with installing and securing a power distribution unit 222 within a mounting substrate shown in the form of substrate 224 having an opening 226 for receiving the power distribution unit 222 within the substrate 224. Substrate 224 has an obverse surface 228 and an indefinite thickness so that opening 226 has an indefinite depth. Opening 226 has been provided with dimensions complementary to the length and width of power distribution unit 222 and presents an installation site where access to a reverse surface is not available to an installer. The present mounting system 220 enables an installer to quickly and effectively install a power distribution unit such as power distribution unit 222 at an installation site having access limited to an obverse surface at the site.

Power distribution unit 222 includes a plurality of electrical receptacles 230 mounted within a casing 232 that envelops electrical circuitry (not shown) that distributes electrical power from a power source (not shown) to the electrical receptacles 230 in a now conventional manner. Casing 232 includes a first wall, shown in the form of an upper wall 236, through which upper wall 236 electrical receptacles 230 project, and a second wall, shown in the form of a lower wall 238. Upper wall 236 has an upper tab 240 extending longitudinally from each end 242 of casing 232, while lower wall 238 has a lower tab 244 extending longitudinally from each end 242 of casing 232, each upper tab 240 extending above a corresponding lower tab 44.

Mounting system 220 includes a trim plate 250 having an upper part 252 with a peripheral edge 254 surrounding an overall area AA for overlapping and covering opening 226 of substrate 224. A lower part 256 of the trim plate 250 is provided with peripheral dimensions for being seated within opening 226, as will be set forth in detail below. Mounting system 220 further includes a coupling construct 260 for coupling the power distribution unit 222 with trim plate 250 and enabling movement of the power distribution unit 222 relative to trim plate 250 in altitudinal directions, between altitudinally spaced apart positions, as now will be described in connection with FIGS. 13 through 15, as well as FIG. 12.

Coupling construct 260 includes a biasing structure 270 comprised of a plurality of posts 272 carried by trim plate 250, each post 272 being affixed to the trim plate 250 and projecting altitudinally downwardly adjacent a corresponding corner 273 of lower part 256 of trim plate 250 to place the posts 272 spaced apart peripherally adjacent peripheral edge 254 of trim plate 250. As described above, in connection with mounting system 20, each post 272 extends through a corresponding aperture in an upper tab 240, in sliding engagement, and a biasing member in the form of a helical spring 276 is placed over and along each post 272, between a corresponding upper tab 240 and a stop 278 threadably engaged with the post 272 so as to enable selective adjustment of a biasing force biasing the power distribution unit 222 in an altitudinally upward direction UDD toward an upper position, illustrated in FIG. 13, wherein electrical receptacles 230 are positioned for ready access.

A retention member in the form of a spring clip 280 includes a basal section 282 and laterally opposite arms 284, preferably unitary with the basal section 282, spaced apart laterally and projecting substantially upwardly in the altitudinally upward direction UDD. Basal section 282 is coupled to power distribution unit 222 in juxtaposition with the lower wall 238 by fasteners shown in the form of push fasteners 286 passed through complementary holes placed adjacent corresponding corners of lower tabs 244 of power distribution unit 222. Spring clip 280 preferably is constructed of spring steel and arms 284 extend upwardly and outwardly to respective fingers 290, each of which fingers 290 terminates at a terminal edge 292 configured with a plurality of teeth 294 spaced altitudinally away from upper part 252 of basal plate 250.

Figure 12:
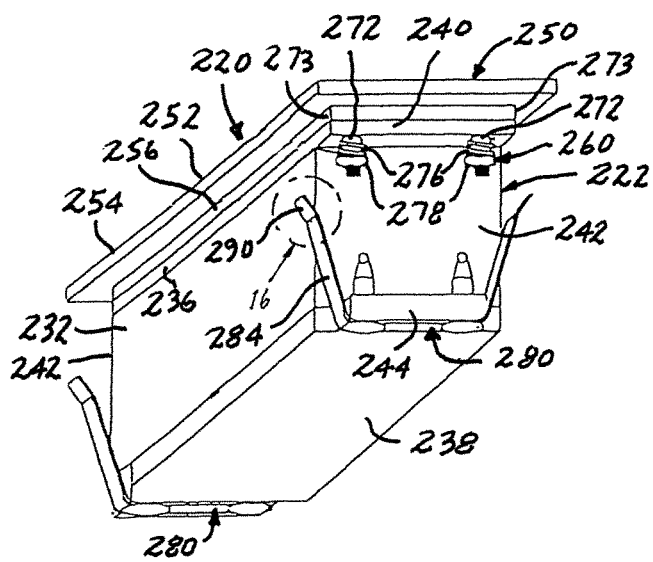
FIG. 12 is a pictorial view illustrating another embodiment of a mounting system constructed in accordance with the present invention.
Figure 13:
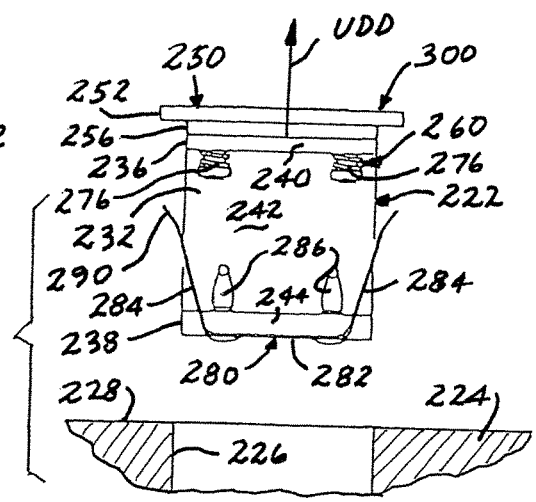
FIG. 13 is a partially diagrammatic view depicting a stage of a method being performed in accordance with the present invention in connection with the embodiment of FIG. 12.
Figure 14:
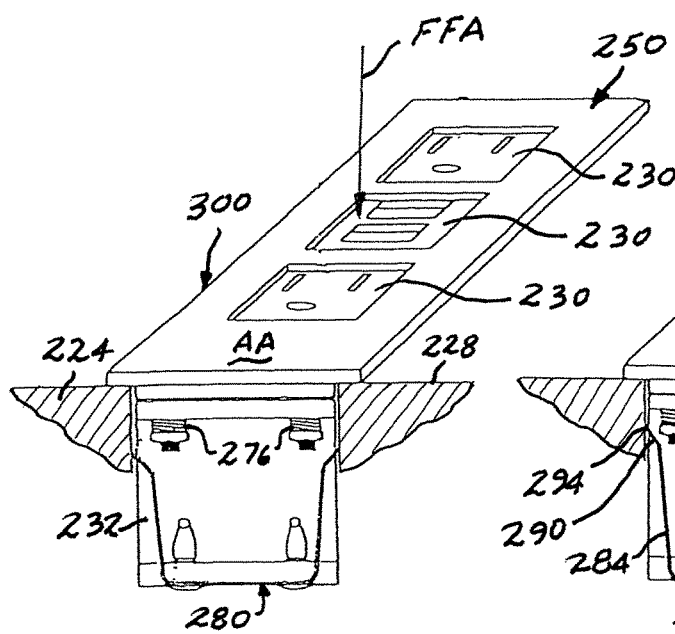
FIG. 14 is a partially diagrammatic view depicting a further stage of the method illustrated in FIG. 13.
Figure 15:
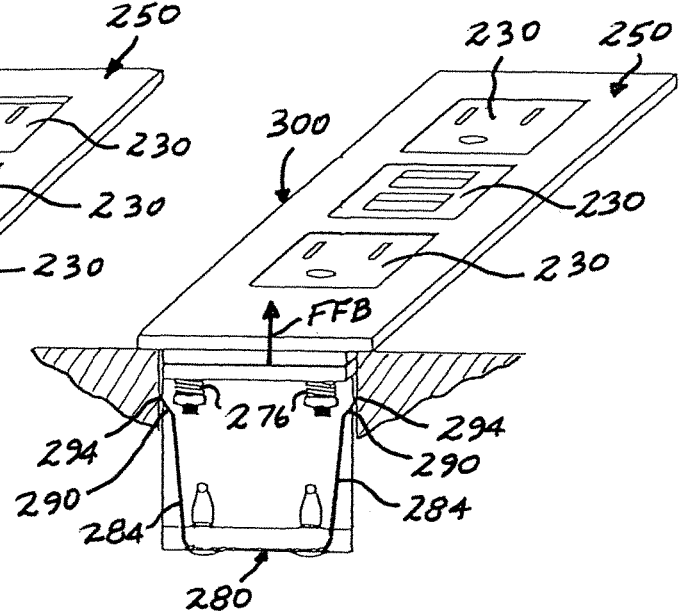
FIG. 15 is a partially diagrammatic view depicting a still further stage of the method.
Figure 16:
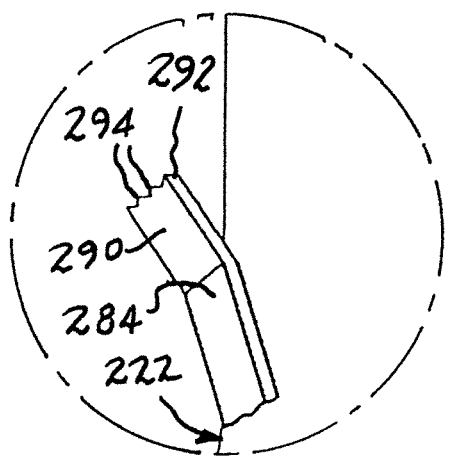
FIG. 16 is an enlarged fragmentary view of a portion of FIG. 12 indicated by arrow 16 in FIG. 12.

With specific reference now to FIGS. 13 through 15, as well as to FIG. 12, power distribution unit 222 is assembled with mounting system 220 in an assembly 300 wherein a spring clip 280 is coupled to power distribution unit 222 adjacent each end of power distribution unit 222, and power distribution unit 222 is coupled to trim plate 250, biased by helical springs 276 into the upper position, against lower part 256 of trim plate 250, all as seen in FIG. 12, and assembly 300 is aligned with opening 226 in substrate 224, as seen in FIG. 13. Then, assembly 300 is lowered into substrate 224 to seat trim plate 250 upon obverse surface 228 of substrate 224, thereby maintaining a stable alignment of assembly 300 within opening 226 and is displaced by pushing against at least one of the exposed electrical receptacles 230, with an altitudinally downwardly directed force, as illustrated at force FFA in FIG. 14, until power distribution unit 222 reaches a lower position relative to trim plate 250. Then, upon release of downwardly directed force FFA, helical springs 276 will move power distribution unit 222 with an upwardly directed biasing force FFB until teeth 294 of fingers 290 of arms 284 securely engage substrate 224, within the substrate 224, beyond obverse surface 228, as seen in FIG. 15, thereby securing assembly 300 in place, fully installed within substrate 224.

Figure 17:
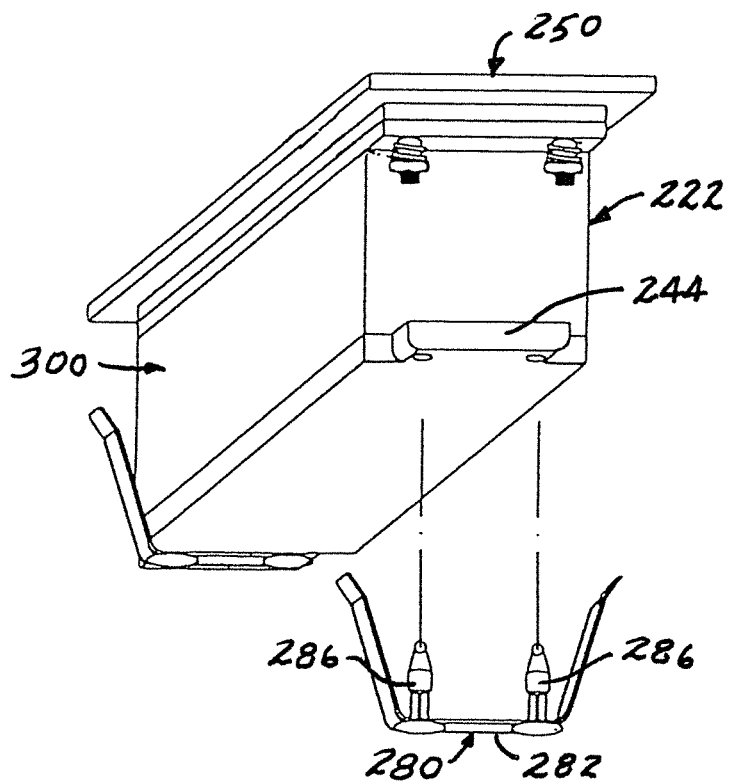
FIG. 17 is a partially diagrammatic pictorial view illustrating a feature of the embodiment depicted in FIG. 12.

Should it become necessary to remove power distribution unit 222 from the installed position illustrated in FIG. 15, a conventional prybar may be inserted between trim plate 250 and the obverse surface 228 of substrate 224, as shown in FIG. 10 in connection with selective removal of assembly 100, and manipulated to move assembly 300 upwardly until push fasteners 286 are released from lower tabs 244, as illustrated in FIG. 17, thereby uncoupling each spring clip 280 from power distribution unit 222, enabling concomitant release of power distribution unit 222 for upward movement out of opening 226 and away from substrate 224.

It will be apparent that the present invention attains all of the objects and advantages summarized above, namely: Provides a system and method enabling a secure mounting of a power distribution unit within an opening in a mounting substrate wherein direct access is not available behind the mounting substrate; establishes a secure "blind hole" installation of a power distribution unit within a mounting substrate; effects an aesthetically attractive installation of a power distribution unit within a mounting substrate; enables selective removal of a power distribution unit installed in a mounting substrate in accordance with the present invention; allows installation and selected removal of a power distribution unit without the necessity for specialized tools; enables a simplified, relatively rapid installation procedure wherein a power distribution unit is secured within a mounting substrate without requiring the use of an installation tool; provides a versatile construction and method adapted for use in a wide variety of settings; performs exemplary service over an extended service life.

It is to be understood that the above detailed description of preferred embodiments of the invention are provided by way of example only. Various details of design, construction and procedure may be modified without departing from the true spirit and scope of the invention, as set forth in the appended claims.

The embodiments of the invention in which an exclusive property or privilege is claimed are defined as follows:

1. A mounting system for securing a power distribution unit within a substrate having an obverse surface and an opening complementary to the power distribution unit and extending into the substrate, altitudinally beyond the obverse surface, for receiving the power distribution unit within the substrate, and an obverse surface surrounding the opening, the mounting system comprising:
    a power distribution unit of predetermined longitudinal length, lateral width and altitudinal depth, the power distribution unit including a first wall, a second wall spaced altitudinally from the first wall, and electrical receptacles carried by the power distribution unit, accessible at the first wall;
    a trim plate for engaging the obverse surface of the substrate to cover the opening of the substrate;
    a coupling construct coupling the power distribution unit with the trim plate for movement of the power distribution unit relative to the trim plate altitudinally between a first position wherein the power distribution unit is in place for ready access to the electrical receptacles, and a second position wherein the power distribution unit is displaced altitudinally away from the first position, the coupling construct including a biasing structure biasing the power distribution unit with a biasing force in an altitudinal direction from the second position toward the first position; and
    laterally spaced apart arms coupled to the power distribution unit in juxtaposition with the second wall, each arm projecting from the power distribution unit substantially in the altitudinal direction and being resiliently biased in a lateral direction from a laterally inward position, wherein each arm is in close juxtaposition with the power distribution unit, toward a laterally outward position, wherein each arm is spaced laterally away from the power distribution unit;
    the arms each having a length terminating at a terminal end such that upon insertion of the power distribution unit into the opening of the substrate, and seating of the trim plate upon the obverse surface of the substrate, covering the opening, displacement of the power distribution unit, relative to the trim plate, into the second position and subsequent release of the power distribution unit for movement toward the first position, in response to the biasing force, each arm will be biased laterally outwardly, from a corresponding inward position toward a corresponding outward position, thereby effecting locking engagement of the terminal ends of the arms with the substrate to secure the power distribution unit in place within the substrate.

2. The mounting system of claim 1 including a retention member having a basal section coupled to the power distribution unit in juxtaposition with the second wall, the laterally spaced apart arms being integrated with and projecting from the basal section.

3. The mounting system of claim 2 wherein the power distribution unit includes longitudinally spaced apart first and second ends, and a retention member is located adjacent each of the first and second ends.

4. The mounting system of claim 2 including fasteners attaching the basal section to the power distribution unit, the fasteners being selectively detachable to enable selective release of the retention member from the power distribution unit, in response to forced movement of the trim plate in the altitudinal direction away from the obverse surface of the substrate, to accomplish selective removal of the power distribution unit from securement within the substrate.

5. The mounting system of claim 1 wherein the substrate includes a given thickness between the obverse surface and a remote reverse surface spaced from the obverse surface by the given thickness of the substrate, and the arms are located such that upon displacement of the power distribution unit from the first position toward the second position, the terminal ends of the arms are located altitudinally beyond the substrate, in juxtaposition with the reverse surface of the substrate and, upon subsequent movement of the power distribution unit altitudinally toward the first position, the terminal ends of the arms will engage the reverse surface of the substrate to secure the power distribution unit in place within the substrate.

6. The mounting system of claim 5 including a retention member having a basal section coupled to the power distribution unit in juxtaposition with the second wall, the laterally spaced apart arms being integrated with and projecting from the basal section.

7. The mounting system of claim 6 including fasteners attaching the basal section to the power distribution unit, the fasteners being selectively detachable from the power distribution unit, in response to forced movement of the trim plate in the altitudinal direction away from the obverse surface of the substrate, enabling selective removal of the power distribution unit from securement within the substrate.

8. The mounting system of claim 1 wherein the opening extends into the substrate altitudinally beyond the obverse surface of the substrate, the terminal ends of the arms each include a gripping finger, and the arms are located such that upon displacement of the power distribution unit from the first position toward the second position, the gripping fingers of the arms are moved toward the second position and, upon subsequent movement of the power distribution unit toward the first position, the gripping fingers of the arms will engage the substrate within the substrate, beyond the obverse surface of the substrate, to secure the power distribution unit in place within the substrate.

9. The mounting system of claim 8 including a retention member having a basal section coupled to the power distribution unit in juxtaposition with the second wall, the laterally spaced apart arms being integrated with and projecting from the basal section.

10. The mounting system of claim 9 including fasteners attaching the basal section to the power distribution unit, the fasteners being selectively detachable from the power distribution unit, in response to forced movement of the trim plate in the altitudinal direction, away from the obverse surface of the substrate, enabling selective removal of the power distribution unit from the substrate.

11. The mounting system of claim 1 wherein the trim plate includes a peripheral edge, and the biasing structure includes a plurality of posts carried by the trim plate, spaced apart peripherally adjacent the peripheral edge of the trim plate and projecting altitudinally into sliding engagement with the power distribution unit, and spring members biasing the power distribution unit into sliding movement along the posts in the altitudinal direction toward the first position.

\* \* \* \* \*